J. WINKELMEYER.
COMPUTING CHEESE CUTTER.
APPLICATION FILED SEPT. 14, 1912.
1,108,297.  
Patented Aug. 25, 1914.
2 SHEETS—SHEET 1.
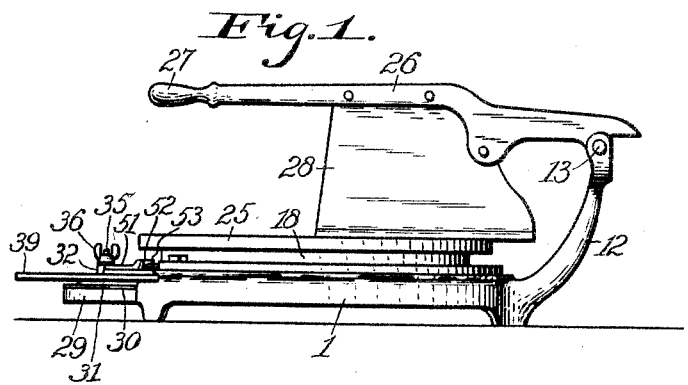
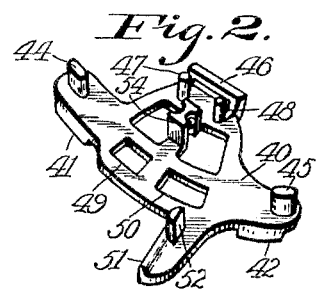
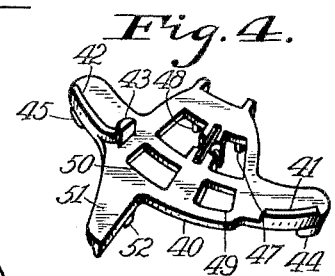
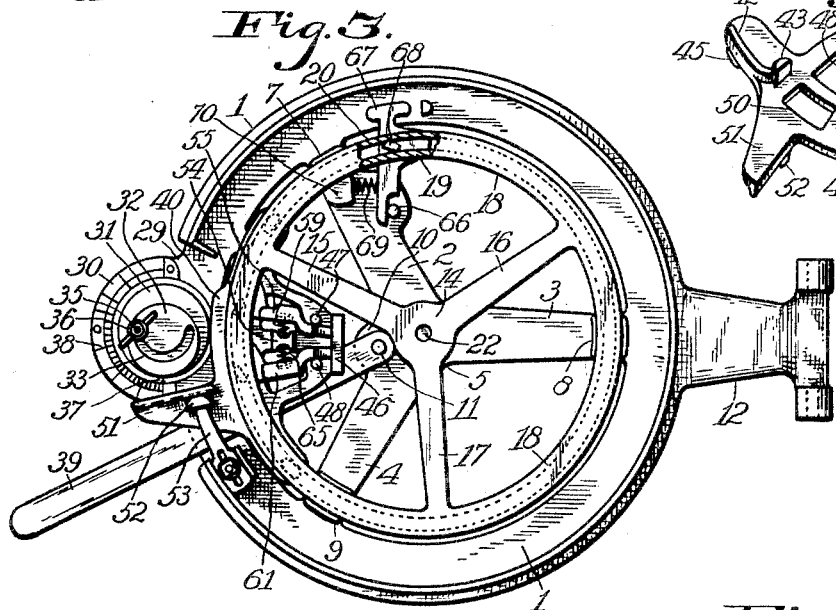
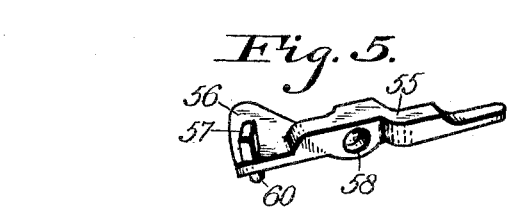
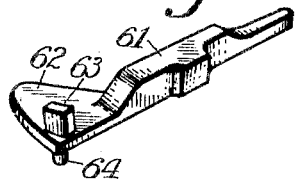
WITNESSES:  
J. H. Gardner.  
M. J. Messenheimer.
INVENTOR:  
John Winkelmeyer,  
BY  
E. T. Silvius,  
ATTORNEY.

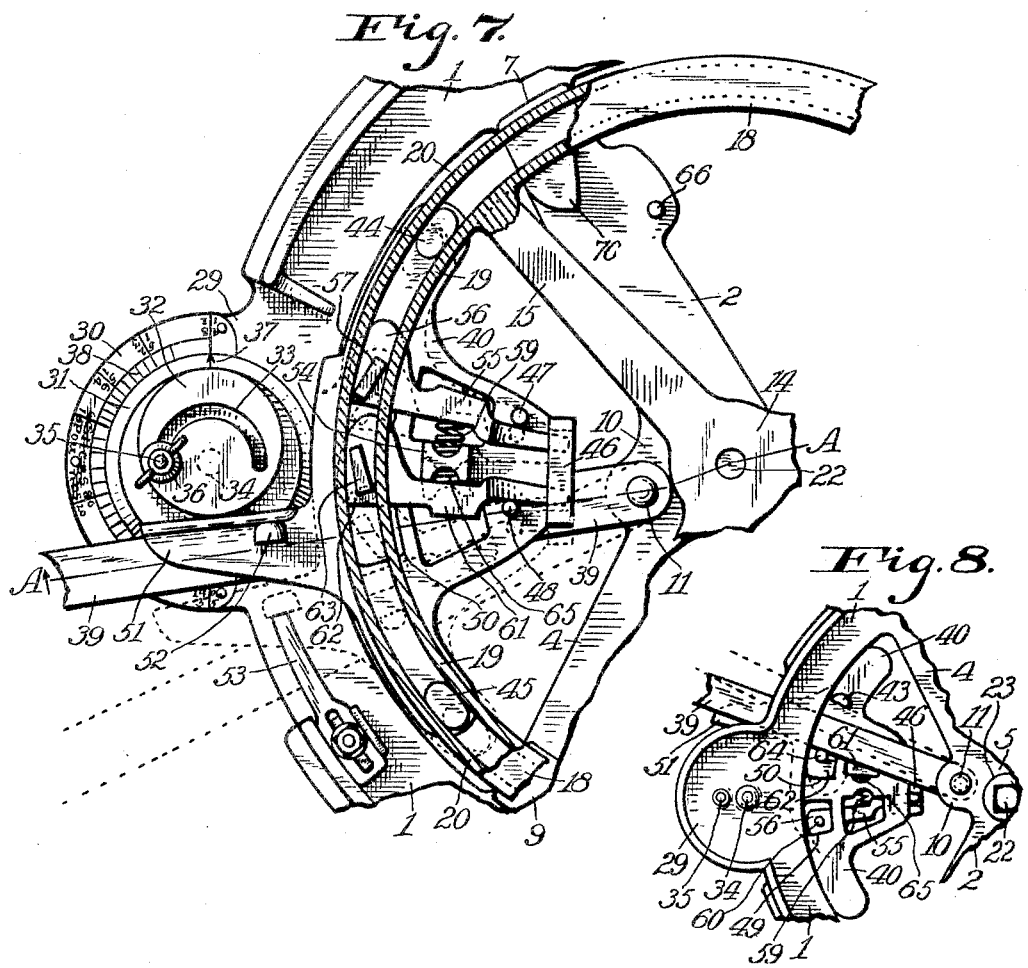

UNITED STATES PATENT OFFICE.

JOHN WINKELMEYER, OF ANDERSON, INDIANA, ASSIGNOR TO SPECIALTY MANUFACTURING COMPANY, OF GREENFIELD, INDIANA, A CORPORATION OF INDIANA.

COMPUTING CHEESE-CUTTER.

1,108,297.  Specification of Letters Patent.  Patented Aug. 25, 1914.

Application filed September 14, 1912. Serial No. 720,382.

*To all whom it may concern:*

Be it known that I, JOHN WINKELMEYER, a citizen of the United States, residing at Anderson, in the county of Madison and State of Indiana, have invented a new and useful Improvement in Computing Cheese-Cutters, of which the following is a specification, reference being had to the accompanying drawings, and to the letters and figures of reference marked thereon.

The invention has reference to the type of machine that comprises a turn-table or rotary cheese table and a cutting knife for dividing a cylindrical cheese into segments or slices suitable to be sold at retail, the invention relating more particularly to means for partially rotating the turn-table the required distances and to means for arresting momentum and accurately stopping the turn-table when moved the required distance, a cheese cutter embodying certain features of construction of the present invention having been described and claimed in my prior application for Letters Patent of the United States, Serial No. 665,735, filed December 14, 1911.

The principal object of the present invention is to provide improved actuating apparatus for the turn-table of cheese cutters, and to provide an improved momentum arrester of such construction as to operate automatically and reliably, especially in case the actuating mechanism fails to operate to stop the turn-table, particularly when the turn-table is violently actuated so that the turn-table is liable to attain momentum.

A further object is to provide an improved automatic momentum arrester of such construction as to be suitable for use in association with a clutch for actuating the turn-table, and which shall be of simple and inexpensive construction, and reliable, durable and economical in use.

This invention consists in a cheese cutter comprising a turn-table, a cutting knife, actuating means for periodically moving the turn-table, a lever for moving the actuating means, and an improved momentum arrester for the turn-table carried by a member of the actuating means and retracted by means of the operating lever, the invention consisting also in improvements in the apparatus for determining and limiting the movement of the turn-table; and the invention consists further in the parts and combinations and arrangements of parts as hereinafter particularly described and claimed.

Referring to the drawings, Figure 1 is a side elevation of the improved cheese cutter; Fig. 2, a perspective view of an improved clutch carrier; Fig. 3, a top plan of the improved cheese cutter minus the cheese board and the cutting knife; Fig. 4, a perspective view of the clutch carrier inverted; Fig. 5, a perspective view of an improved actuating clutch; Fig. 6, a perspective view of an improved stopping clutch comprising a part of the improved momentum arrester; Fig. 7, a fragmentary plan of the machine partially in horizontal section; Fig. 8, a fragmentary inverted plan view showing portions of the operating mechanism; and Fig. 9, a vertical section approximately on the line A A in Fig. 7.

Throughout the different figures of the drawings, similar reference characters indicate corresponding elements or features of construction herein referred to.

The machine includes a main frame which may be variously constructed and preferably comprises an annular portion 1 connected to arms 2, 3, 4, that converge to and are connected to a bored hub 5 having a counter-bore 6 in its under portion, the top of the frame having bearing blocks 7, 8, 9, thereon, the hub having a projection 10 on its forward side that is provided with a pivot 11, the rear portion of the frame having a projecting frame arm 12 thereon provided with a pivot 13. A turn-table may suitably comprise a central hub 14 from which extends a number of arms 15, 16, 17, to which is connected an annular rim portion 18 preferably having downwardly extending concentrically arranged flanges 19 and 20 in contact with the bearing blocks, the hub 14 being rotatably supported on the hub 5 and having a center pin 21 that is guided in and extends through the hub 5 and has a bolt 22 connected to its lower end, the bolt securing a washer or head 23 to the lower end of the pin, and a coil spring 24 is seated on the washer and against the bottom of the counter-bore, so that the hub 14 has frictional resistance on the hub 5. The turn-table is provided as usual with a top or cheese board 25 for supporting a cylindrical cheese. A knife frame 26 is connected to the pivot 13 and has a handle 27, a knife 28 being secured to the frame to coöperate with the cheese board.

A suitable computing scale together with an adjustable stop and also a fixed stop are provided for determining and limiting the movement of the turn-table so as to cut slices of cheese of the required thickness, and preferably certain parts are employed as previously described in said prior application for Letters Patent, the forward portion of the frame having a projecting table 29 on which is a scale plate 30 surmounted by a disk or wheel 31 having an integral stop block 32 thereon through which extends a curved slot 33, the wheel having an axial shaft 34 rotatably mounted in the table 29, the stop block being eccentric to the axis of rotation thereof. A binding screw 35 is connected to the table 29 and extends through the curved slot and has a thumb-nut 36 thereon and normally seated upon the stop block, the edge of the wheel having an indicating mark 37 thereon to be moved to any one of a suitable number of computing scale marks 38 on the indicator plate. An operating lever 39 is connected to the pivot 11 and extends over to and beyond the forward portion of the frame and may be moved partially over the disk or wheel 31. The lever obviously may be pivoted to any suitable portion of the main frame.

An improved clutch carrier 40 is provided which is in the form of a plate of suitable contour and is arranged upon or above the lever 39 and under the annular portion 18 of the turn-table frame, the carrier preferably having bearing projections 41 and 42 spaced apart on the under side thereof adapted to have sliding contact with the annular portion 1 of the main frame, to prevent the carrier from tilting in operation, the under side of the carrier having also a lug 43 thereon adjacent to one of the projections for moving the carrier by means of the lever in one direction. The upper side of the carrier has two guide projections 44 and 45 thereon that extend between and are guided by the flanges 19 and 20. It should be understood, however, that the carrier obviously may be otherwise guided if desired. The carrier extends inwardly toward the hub 5 and has a horizontal guide bar 46 on its inner portion that is somewhat higher than the plane of the top of said plate comprising the carrier, the top of said plate having two pivotal studs 47 and 48 thereon adjacent to the guide bar 46, the studs being between the plane of the guide and the flange 19. The forward portion of the carrier plate has two apertures 49 and 50 therein that are under the annular portion 18 of the turn-table, and the forward portion of the plate has also a finger 51 thereon on the top of which is a stop projection or shoulder 52, the finger being designed to be moved into contact with the adjustable stop block 32 for limiting the movement of the carrier in one direction, the shoulder 54 being brought to a stop 53 secured upon the frame portion 1 for limiting the movement of the carrier in the opposite direction and for accurately stopping the carrier, the carrier being a medium for stopping the turn-table when moved the required distance preparatory to making a cut of cheese. The carrier is provided also with an abutment 54 arranged in a plate between the studs 47 and 48 and the adjacent annular portion 18 of the turn-table. An improved actuating clutch comprising a bar 55 is provided and placed upon the carrier at one side of the abutment 54 and against the stud 47 and opposite to the stud 48, and the bar extends under the guide 46. The outer end or normally forward portion of the bar has a guide plate 56 thereon that extends under the flanges 19 and 20 and is guided slidingly on the carrier plate, and it has a clutch member 57 thereon that extends upward between the flanges 19 and 20 to be forced into contact with the opposite faces thereof, the member being slightly longer circumferentially of the flanges than the distance between the flanges. The bar 55 preferably has a recessed spring seat 58 therein in which is seated a coil spring 59 which is seated in the adjacent side of the abutment 54, so that the spring normally forces the member 57 into clutching engagement with the adjacent flanges. The guide plate 58 preferably has a projection 60 on its under side to extend through the aperture 49 so as to limit the movement of the bar 55 when the turn-table is removed from the main frame. If the operating lever 39 be moved away from the stop block 32 until it engages the lug 43 the clutch carrier is moved also, and while the member 57 is forced into engagement with the flanges 19 and 20 the tendency is to drag the bar 55 by means of the stud 47 so that the turn-table also must move forward. If the carrier be moved in the opposite direction and the turn-table is prevented from moving backward it is evident that the spring 59 yields and permits the arm 55 to swing around slightly so as to release the pressure of the member 57 on the adjacent flanges and permit the clutch member to slide freely against the flanges. When moving the turn-table forward slowly no momentum may be attained and the turn-table may stop when the clutch carrier is stopped, but since accuracy of measurement is required the actuating clutch alone, operating as above described, is not dependable for accurately stopping the turn-table under all conditions under which the cheese cutter may be carelessly operated.

For the above mentioned reasons, an improved momentum arrester is provided which is not dependent for its action on certain conditions that might be varied by the operator but must act automatically under all conditions. The momentum arrester comprises a bar 61 that is arranged adjacent to the opposite side of the abutment 54 and against the stud 48 so as to extend under the guide 46, the forward portion of the bar having a guide plate 62 thereon extending under the flanges 19 and 20, and it has a clutch member 63 thereon that extends upward between and normally in contact with the two flanges 19 and 20, the member being slightly longer circumferentially of the flanges than the distance between the flanges. The under side of the plate 62 has a lug 64 thereon that extends through the aperture 50 to be engaged by the lever 39 when the latter is moved toward the stop block 32, for releasing the member 63 from forcible contact with the adjacent flanges, the member being forced into contact with the flanges by a coil spring 65 seated in the bar 61 and in the abutment 54. It will be seen that the clutch members 57 and 63 are oppositely arranged so that while the bars 55 and 61 are forced apart or each away from the other, the clutch members grip the flanges in reverse order, the member 63 preventing the table from moving forward by momentum relative to the bar 61 which is held back from advance movement by the stud 48. When the lever 39 moves toward the stop block 32 it carries the projection 64 in the aperture 50 until stopped at the end of the aperture, after which the carrier plate is moved along with the lever until stopped by the finger 51 coming in contact with the block 32.

Any suitable means may be provided for preventing accidental backward movement of the turn-table, and for this purpose one frame arm 2 preferably is provided with a pivotal stud 66 against which a clutch bar 67 is slidingly placed and provided with a clutch member 68 that extends upward between the flanges 19 and 20 and normally forced into contact therewith by a spring 69 seated against the bar 67 and in an abutment 70 formed on the arm 2, this appliance having been described in said prior patent application.

Various modifications may be made in the details of construction in carrying out the objects of my invention, and in mounting both the automatic actuating clutch and momentum arrester on one and the same carrier, the momentum arrester may be variously constructed.

In practical use, the adjustable stop block is properly set and reset as frequently as may be required, and when the knife is moved away from the cheese the turn-table is partially rotated by simply moving the lever 39 first toward the adjustable stop block until stopped by means of the finger 51 and then moved in the opposite direction until stopped by the shoulder 52 coming in contact with the fixed stop 53, the turn-table being automatically gripped at all times and released from the actuating device and the arrester device as above explained, the table being positively stopped when the clutch carrier is stopped at the end of the measuring stroke, so that the different slices of cheese severed shall be of the required thickness as may be predetermined.

Having thus described the invention, what is claimed as new is:—

1. A cheese cutter including a frame, a table rotatable on the frame, a guided clutch carrier having a shoulder thereon, a stop fixed on the frame to be engaged by the shoulder, and two reversely acting clutch devices adapted for engaging the table mounted on the carrier.

2. A cheese cutter including a rotatable table a guided clutch carrier, and an actuator clutch and also an arrester clutch mounted on the carrier and simultaneously acting automatically, the actuator engaging the table for rotating it, and the arrester engaging the table for stopping its movement on stopping of the actuator.

3. A cheese cutter including a frame, a table rotatable on the frame, an adjustable stop and also a fixed stop on the frame, a clutch carrier suitably guided and movable alternatively to the stops, and devices for actuating and also stopping the table movably mounted on the carrier.

4. A cheese cutter including a rotatable table, a clutch carrier movably guided, and two spring-pressed clutch devices movably mounted on the carrier for engaging and applying force to the table in opposite directions for enabling the carrier to rotate and subsequently also stop the table automatically.

5. A cheese cutter including a frame, a table rotatable on the frame, a clutch carrier guided to move adjacent to the table and provided with clutching means for moving the table and also clutch means for arresting momentum of the table, and a stop mounted on the frame in the path of movement of the clutch carrier.

6. A cheese cutter including a frame, a table rotatable on the frame, an adjustable stop and a fixed stop on the frame, a clutch carrier movably guided and having a finger thereon provided with a shoulder to engage the fixed stop on movement in one direction, the finger engaging the adjustable stop on movement of the carrier in the opposite direction, and a clutch for the table mounted on the carrier.

7. A cheese cutter including a rotatable table, actuating and momentum arresting means for the table movable bodily together with the table, the actuating means exerting force in one direction to move the table, the arresting means exerting force in the opposite direction for stopping the table, and means for stopping the bodily movement of the actuating means and the arresting means to stop the table.

8. A cheese cutter including a rotatable table, a movably guided carrier having an abutment and two studs thereon, two clutch bars on the carrier on opposite sides of the abutment and in contact respectively with adjacent sides of the two studs, the bars having clutch members thereon for respectively engaging the table and applying force thereto in opposite directions, and two springs seated on opposite sides respectively of the abutment and acting to force the two bars each away from the other.

9. A cheese cutter including a frame, a table rotatable on the frame, a stop fixed on the frame, a movably guided clutch carrier having a shoulder movable to the stop and having also a lug, an actuating clutch for the table mounted on the carrier, a momentum arresting clutch movably mounted on the carrier and automatically engaging the table for stopping movement thereof, the arresting clutch having a projection thereon, and a lever pivoted to the table and movable alternatively to the lug and the projection.

10. A cheese cutter including a frame, a table rotatable on the frame, an adjustable stop and also a fixed stop mounted on the frame, a clutch carrier suitably guided and movable alternatively to the stops, an operating lever pivoted to the frame for moving the carrier, a clutch acting to rotate the table on movement of the lever in one direction, and a momentum arrester clutch movably mounted on the carrier and acting to stop the table when the carrier is stopped, the arrester clutch being engaged by the lever when moved in the reverse direction to release the clutch from acting.

11. In a cheese cutter, the combination with a frame and a table rotatable thereon, of a clutch carrier having an aperture therein and having also a lug, a clutch mounted on the carrer for rotating the table, a momentum arresting clutch for the table movably mounted on the carrier and spring-pressed into engagement with the table for stopping the table, the arresting clutch having a projection thereon extending through said aperture, a stop fixed on the frame to be engaged by the carrier, and a lever pivoted to the frame and movable to the lug for moving the carrier in one direction to actuate the table, the lever being movable to the projection for disengaging the arresting clutch from the table and moving the carrier in the opposite direction.

12. In a cheese cutter, the combination with a frame and a table rotatable thereon, and an adjustable stop and a fixed stop on the frame, of a clutch carrier movably guided and directly stopped alternatively by the said two stops, a table-actuating clutch mounted on the carrier for engagement with the table to rotatably move the table, a momentum arresting clutch movably mounted on the carrier for engagement with the table for stopping the table, a lever pivoted to the frame for moving the carrier, and means enabling the lever to disengage the arresting clutch from the table and subsequently move the carrier away from the fixed stop.

13. In a cheese cutter, the combination of a rotatable table, two annular flanges concentrically fixed on the under side of the table, and a clutch carrier movably supported below the table and having two guide projections and also two clutch devices thereon extending upward between the two flanges, the clutch devices being movable on the carrier between the projections and spring-pressed in opposite directions, one clutch device being adapted for engaging the flanges to rotate the table, the remaining clutch device being adapted for engaging the flanges to arrest momentum of the table.

14. In a cheese cutter, the combination with a frame and a table rotatable thereon, and an adjustable stop and a fixed stop on the frame, of a clutch carrier movably guided and having a finger thereon provided with a shoulder that is movable thereby to the fixed stop, the finger being movable into contact with the adjustable stop, and an actuating clutch and also a momentum arrester for the table mounted on the carrier.

15. In a cheese cutter, the combination with a frame and a table rotatable thereon, of a clutch carrier having two guide projections spaced apart thereon and guided on the frame and having also a lug between and adjacent to one of the projections, a lever pivoted to the frame and extending between the lug and the remaining one of the projections to engage the lug for moving the carrier, and an actuating clutch for the table mounted on the carrier.

In testimony whereof, I affix my signature in presence of two witnesses.

JOHN WINKELMEYER.

Witnesses:
 ALMA BASSETT,
 LOIS BOONE.

Copies of this patent may be obtained for five cents each, by addressing the "Commissioner of Patents, Washington, D. C."